May 22, 1956

R. I. ROTH 2,746,549

SELECTIVE FILM CONTROL FOR CARD PUNCH

Filed July 20, 1951

INVENTOR
ROBERT I. ROTH
BY Robert S. Dunham
ATTORNEY

May 22, 1956  R. I. ROTH  2,746,549
SELECTIVE FILM CONTROL FOR CARD PUNCH
Filed July 20, 1951  11 Sheets-Sheet 2

INVENTOR
ROBERT I. ROTH
BY *Robert S. Dunlap*
ATTORNEY

May 22, 1956 R. I. ROTH 2,746,549
SELECTIVE FILM CONTROL FOR CARD PUNCH
Filed July 20, 1951 11 Sheets-Sheet 3

INVENTOR
ROBERT I. ROTH
BY Robert S. Dunlap
ATTORNEY

May 22, 1956  R. I. ROTH  2,746,549
SELECTIVE FILM CONTROL FOR CARD PUNCH
Filed July 20, 1951  11 Sheets-Sheet 4

INVENTOR
ROBERT I. ROTH
BY Robert S. Dunlam
ATTORNEY

May 22, 1956 R. I. ROTH 2,746,549
SELECTIVE FILM CONTROL FOR CARD PUNCH
Filed July 20, 1951 11 Sheets-Sheet 5

INVENTOR
ROBERT I. ROTH
BY *Robert S. Dunlap*
ATTORNEY

May 22, 1956

R. I. ROTH 2,746,549

SELECTIVE FILM CONTROL FOR CARD PUNCH

Filed July 20, 1951

INVENTOR
ROBERT I. ROTH
BY *Robert S. Dunham*
ATTORNEY

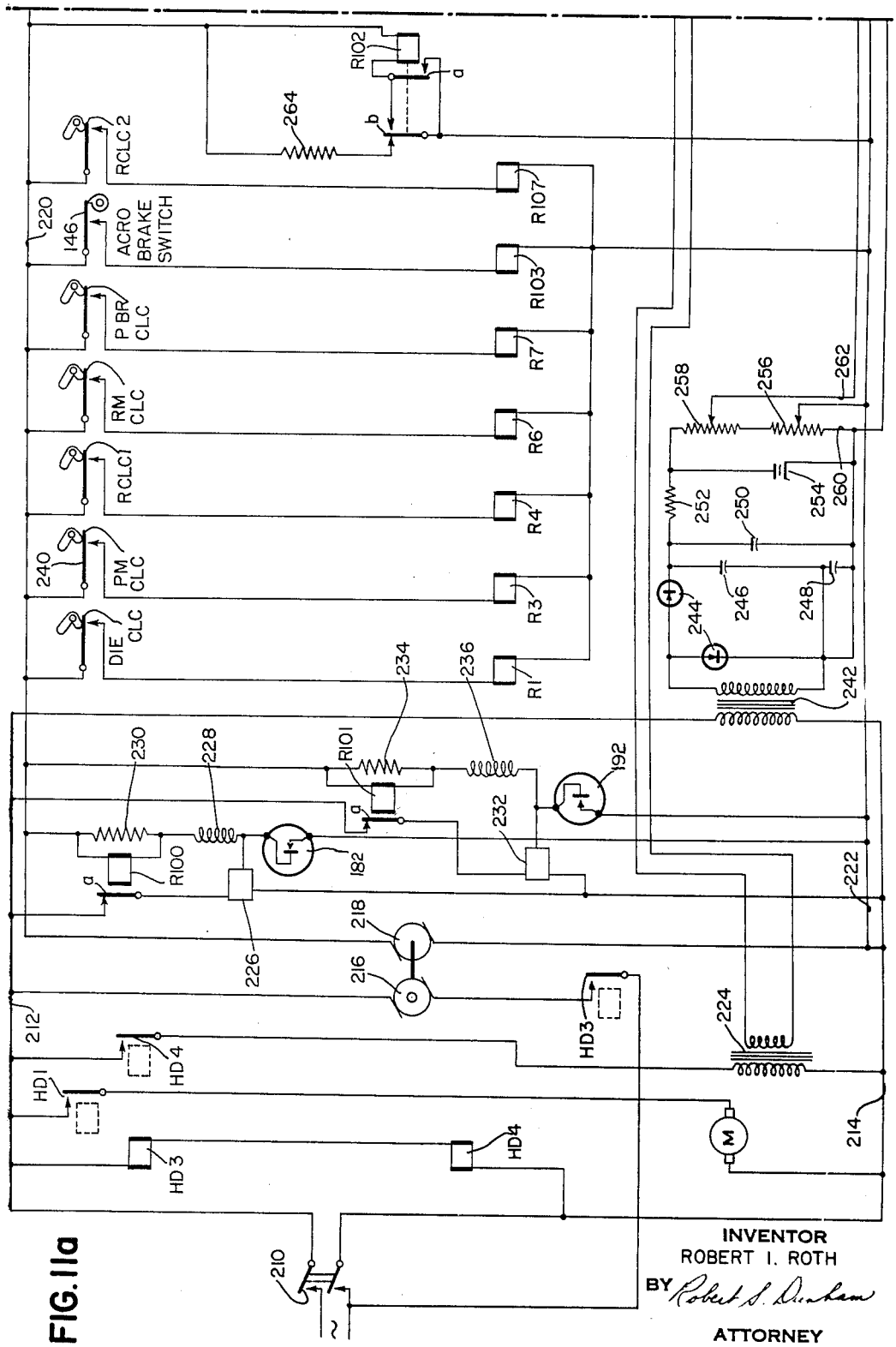

May 22, 1956 R. I. ROTH 2,746,549
SELECTIVE FILM CONTROL FOR CARD PUNCH
Filed July 20, 1951 11 Sheets-Sheet 9

INVENTOR
ROBERT I. ROTH
BY Robert S. Dunham
ATTORNEY

May 22, 1956 R. I. ROTH 2,746,549
SELECTIVE FILM CONTROL FOR CARD PUNCH
Filed July 20, 1951 11 Sheets-Sheet 10

INVENTOR
ROBERT I. ROTH
BY Robert S. Dunham
ATTORNEY

May 22, 1956 — R. I. ROTH — 2,746,549
SELECTIVE FILM CONTROL FOR CARD PUNCH
Filed July 20, 1951 — 11 Sheets-Sheet 11

INVENTOR
ROBERT I. ROTH
BY Robert S. Dunham
ATTORNEY

United States Patent Office 2,746,549
Patented May 22, 1956

2,746,549

SELECTIVE FILM CONTROL FOR CARD PUNCH

Robert I. Roth, Mount Pleasant, N. Y., assignor to International Business Machines Corporation, New York, N. Y., a corporation of New York Application July 20, 1951, Serial No. 237,732

5 Claims. (Cl. 164—115)

This invention relates to a machine for reproducing records. More particularly, the invention relates to a machine for reproducing records by perforating record cards under control of a photographic film.

It is the broad object of this invention to provide a machine and control means for reproducing record cards by perforating under control of a photographic film on which a plurality of perforated records have been photographed and on which are contained a plurality of records constituting different groups or classes of information, the machine and reproducing system being so conditioned as automatically to select from a photographic strip the records of a single group or class of date for reproduction.

It is a further object of the invention to provide in a film sensing machine, an optical system for sensing and reading photographically recorded records wherein record reading and control indicia reading takes place at the same time and at the same general location in the optical system. Accordingly a film sensing machine is provided in which both control and reading stations are located on the periphery of a single film sprocket, thus insuring that the film is at all times in proper vertical registration.

It is a further object of the invention, although not limited to the reproduction of records by perforating, to provide a single projection lens to project information from both control and reading stations of a record sensing device to separate banks of photoelectric cells or other light sensitive means.

Machines now in general use and known as reproducers are adapted to feed blank record cards and to punch them. Punching may be under control of another set of record cards. Such reproducer is shown in the Lake Patent No. 2,032,805. The structure of the Lake patent is so well understood as to render unnecessary more than a very general description of its function. When the machine shown in that patent is conditioned for reproducing record cards, punched record cards and blank cards are fed in synchronism from two feed hoppers. An interlock prevents starting of the machine until cards are in both hoppers. The one hopper contains the pattern or original cards which are already perforated, and the other hopper holds the blank cards which are to be perforated to correspond to the original cards. As the cards are fed from the hoppers, a pattern card and an associated blank card are simultaneously placed in related feeding rollers and then moved along concurrently and in synchronism, the blank card having an intermittent movement. The pattern cards pass a sensing station and the blank cards pass a punching station. The cards are of the regular Hollerith form and are fed laterally across the short width with the "12" index point positions leading so that if a class selection or other control function is to be exercised by a special hole in the 11th or 12th position, the punching may be controlled as it follows thereafter. The blank card pauses momentarily at each index point position, so that if a perforation is to be reproduced, the punch has time to penetrate and withdraw from the punched card.

The blank card is drawn under a single line of punches, there being one punch for each column of index points on the card, the card moving to bring the various digit index positions successively under the punches. At the same time that the blank card is passing under a single line of punches, the pattern card is passing over a single line of sensing brushes. Each sensing brush is connected to a magnet for controlling a related punch.

The pattern card is sensed at each line of index points, and if a perforation appears a circuit is established through one of the punch control magnets, the armature of which is connected by a control wire to an interposer pawl articulated on the end of a punch plunger.

In my application for patent, Serial No. 88,452, entitled "Card to Film and Film to Card Machine," filed April 19, 1949, now Patent No. 2,697,649, issued December 21, 1954, I have disclosed a machine for photographing onto a film strip a succession of perforated record cards. The application also discloses means for utilizing the same equipment to reproduce perforated record cards under the control of the film strip. The device of my aforesaid application is entirely adequate to the reproduction of cards in accordance with all frames of a film strip. However, it does not make provision for the control of a reproducing punch for the selective reproduction of records from scattered film frames. In those instances in which perforated records have control numbers thereon and it is desired to reproduce punched records under control of such control numbers, I have provided in this application for the reading and storing of a control number from a record card, whereafter the film recorded records will be fed through the film sensing station of the projecting and control mechanism herein until an agreement appears between the control number on the film frame and the control number in storage. The arrangement herein is such that the agreement will be made as the film passes a control station and on the next cycle as the film passes a reading station the data on the film will be punched into a card. During this latter cycle the cards in the reading unit of the reproducer will be advanced and the control number for the next card will be sensed and stored and also compared with the next film frame which is passing the control station.

For this controlled reproducing operation the film is fed through the projector unit of the machine, and in its passage acts as a shutter and allows the passage of light or shuts off the passage of light from a light source to a bank of photocells. The photocells when activated call into operation related punch magnets in the reproducer, thereby causing the punching of a card in the punching section of the reproducer. Accordingly data of a given frame on the film strip is converted into punched data on the reproduced record card.

Further objects and advantages of the invention will appear as the description of the machine and its control system are described in connection with the drawings forming a part of the application and wherein:

Figs. 11a through 11d illustrate the electrical control circuit; and

Figure 7:
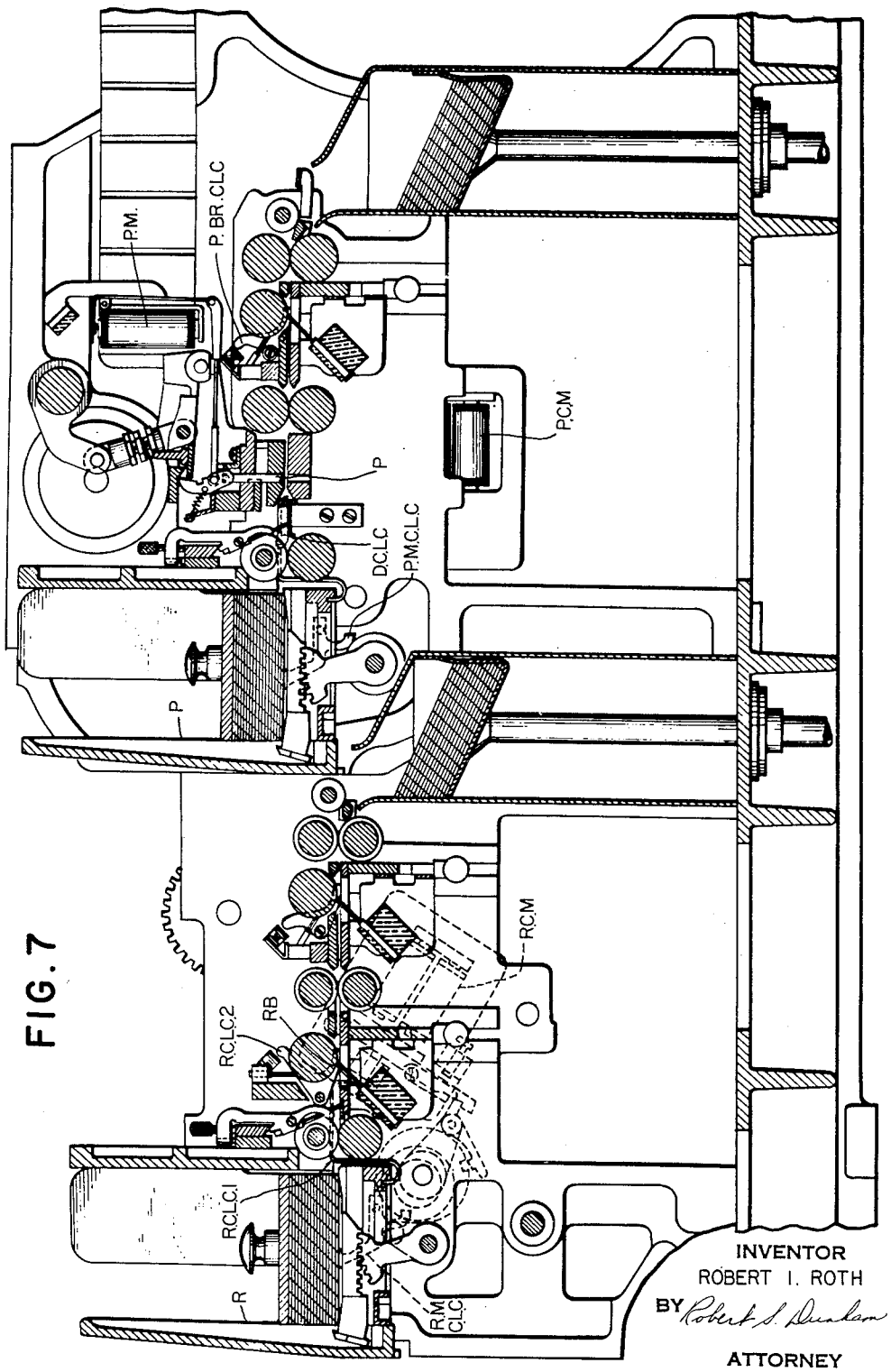
Fig. 7 is a sectional view through a reproducer which corresponds to Fig. 3 of the Lake Patent No. 2,032,805.

The reproducer shown in Fig. 7 of the drawings has a pair of card magazines R and P. The magazine R is adapted to receive a stack of perforated record cards, while the magazine P is adapted to receive a stack of blank cards in which punched records are to be reproduced. Each of the card magazines includes well known mechanism for feeding cards in synchronism from the bottom of the packs into the feed rollers of the reproducer; the cards from the magazine R are fed from the bottom of the stack into feed rollers which deliver these cards successively to the reading brushes RB of a card sensing station. The feed mechanism of magazine P feeds the cards therein from the bottom of the stack into feed rollers which deliver the cards successively to a row of punches P in the punching section of the reproducer.

In order that the description of the control system for the machine may be rendered intelligible, it should be noted at this point that the reproducer has certain circuit components which are essential to the control thereof. Within the magazine R is a card control lever and contact RMCLC. In the reading station in proximity to the reading brushes RB is a card lever and contact RCLC2. The reading section of the reproducer is generally under control of read clutch magnet RCM. In the punching section of the reproducer are several essential control components consisting of a punch magazine card lever and contact PMCLC, a die card lever and contact DCLC, a punch clutch magnet PM, a series of punch magnets PM, a punch clutch magnet PCM and a card controlled contact lever PBRCLC. The nature and function of these control instrumentalities herein is the same as illustrated and described in the Lake Patent No. 2,032,805. It may be noted in passing that for the purpose of the present invention the second set of brushes in the reading section of the reproducer need not be employed.

Figure 5:
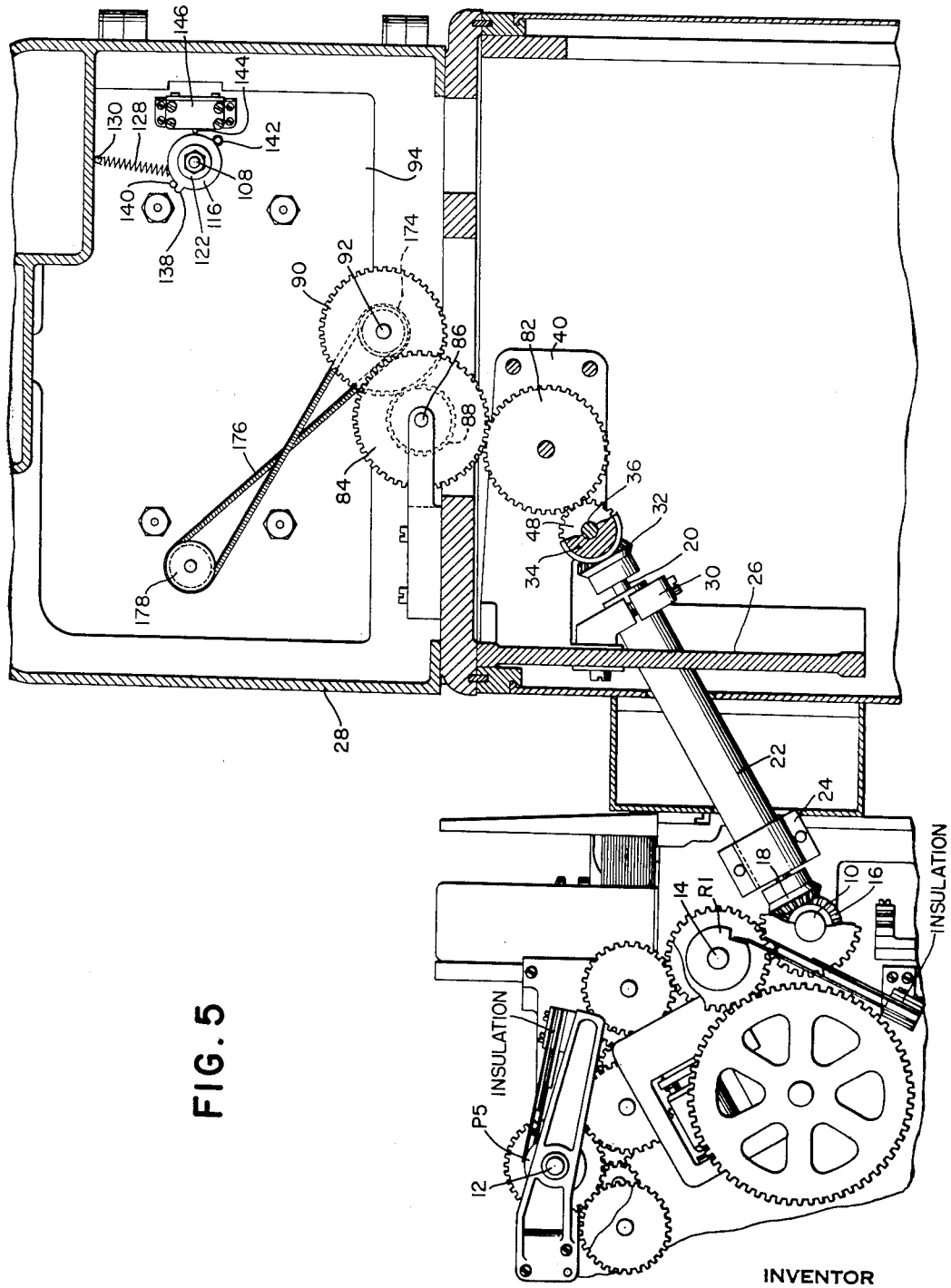
Fig. 5 is a sectional view through a film projection cabinet connected for drive with an end of the reproducer shown in the Lake Patent No. 2,032,805.

Fig. 5 of the drawings illustrates the manner in which power for the optical unit is taken from a shaft 10 of the reproducer. The shaft 10 runs continuously. However, before describing in detail the drive connection between the reproducer shaft 10 and the optical system, it may be appropriate to note at this point the location of certain contact operating cams necessary to the function of the control circuit. The left portion of Fig. 5 is a fragmentary portion of the left end of the reproducer as seen in Fig. 7. A shaft 12 in Fig. 5 has fixed for rotation therewith cam P5 and its associated contacts (see also Fig. 11d). A shaft 14 has fixed for rotation therewith the R cams, i. e. cR1, cR2 and cRX (Figs. 11c and 11d), while shaft 10 carries the C cams, namely C1, C2, C3, C4, CX (Fig. 11d) and CY (Fig. 11b), the emitters shown in Figs. 11b and 11c of the drawings and cams M and B shown at the top of Fig. 11b of the drawings.

On the shaft 10 is a miter gear 16 in contact with its mate 18 fast on shaft 20 which is mounted on ball bearings within a tube 22. The tube 22, at its lower end, is attached to the reproducer by means of clamps 24, and at its upper end it is supported on a wall 26 of the optical cabinet 28 by means of a bracket 30. On the upper end of the shaft 20 is a miter gear 32 driving its mate 34 which is free to rotate on a shaft 36 at the same speed as the shaft 10 of the reproducer.

At this point it is appropriate to note that cams Fa, Fb, Fc, Fd (see also Fig. 11b) and Fe (Fig. 11d) are fixed to the shaft 36 and rotate therewith. Three of these cams are illustrated in Fig. 8.

Figure 8:
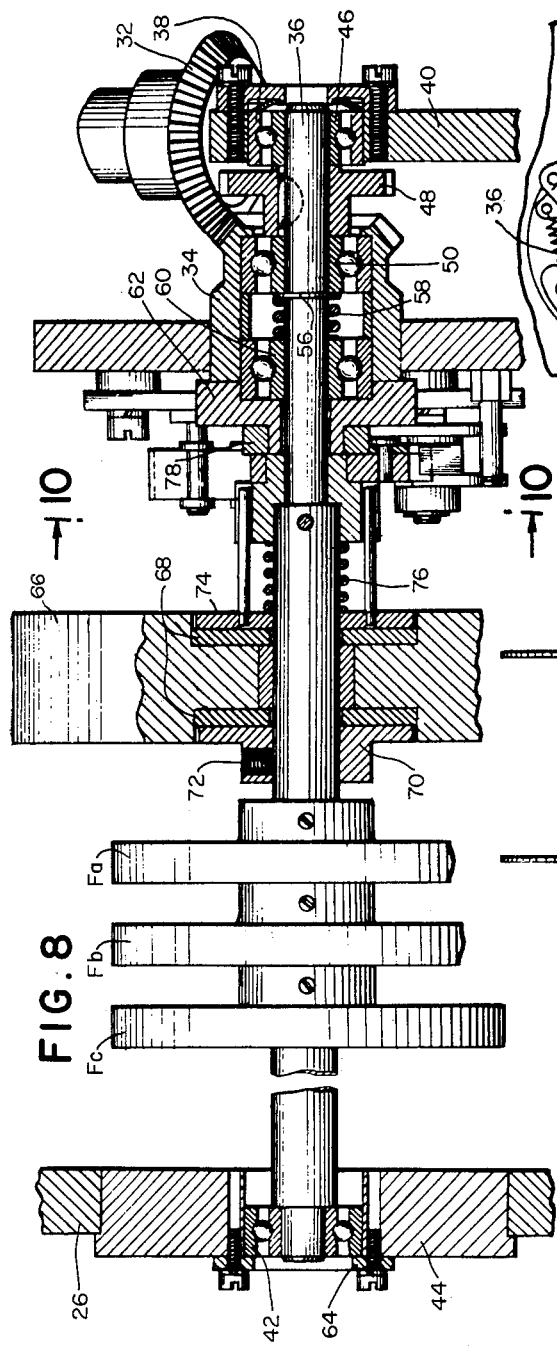
Fig. 8 is a view of the cam shaft within the optical cabinet adapted to be driven by the upwardly inclined drive shaft interconnecting the optical cabinet and the reproducer shown in Fig. 5.
Figure 10:
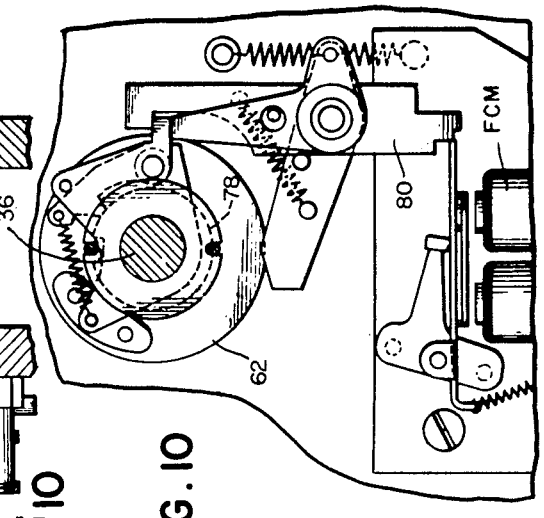
Fig. 10 is a detail view of the clutch mechanism taken on line 10—10 of Fig. 8.

The supporting and drive mechanism for the shaft 36 can best be seen in Figs. 8 and 10 of the drawings. The shaft 36 is supported at both ends by ball bearings. At the right end of the shaft (as seen in Fig. 8) the outer bearing race 38 is held in an outwardly extending bracket 40 attached to the frame 26 (see Fig. 5). The bearing 42 at the left end of the shaft 36 is held in a plate 44 attached by screws to the optical housing frame 26. At the right end (Fig. 8) of the shaft 36 the inner race 46 of the bearing bears against the hub of a spur gear 48 keyed to the shaft 36. The other side of gear 48 bears against the inner race 50 of one of the ball bearing assemblies contained within the hub of the bevel gear 34. The inner face of the ball bearing race 50 in turn bears against a spring clip 56. A bearing spring 58 exerts force between the spring clip 56 and the inner face of the inner bearing race 60, thereby pressing the opposite face of the race 60 against a bearing cap 62. This force serves to locate the gear 34 on the shaft 36. In this manner the parts just described are located against axial shifting. The retaining plate 64 is removably attached to the plate 44 so that the F cams, Fa through Fe, can be easily replaced.

Mounted on the shaft 36 is a flywheel 66 driven through friction discs 68 set into its hub. A friction collar in the form of a disc 70 is fixed to the shaft 36 by means of a set screw 72, and a companion disc 74 on the opposite side of the flywheel is pressed axially by a coil spring 76, whereby the flywheel is driven only by the friction between its friction discs 68 and the discs 70 and 74. The flywheel is, therefore, free to rotate slightly, under impact, with reference to the shaft 36.

In Fig. 8 the cap 62 has rigidly fastened to it a notched member 78 of the well known single revolution type of clutch as described in Bryce Patent No. 2,302,002. This clutch structure is somewhat more fully illustrated in Fig. 10 of the drawings. Energization of the clutch magnet FCM (see also Fig. 11d) will release the usual clutch latch 80, which will cause rotation of the shaft 36, gear 48, idler gear 82 (Fig. 5) and, through it, gear 84 on stud 86. The gear 84 carries on its hub a pinion 88 which is in driving contact with a gear 90 secured to a shaft 92, which is the drive shaft of the optical unit of Fig. 1, mounted on the opposite side of the cabinet plate 94.

Figure 1:
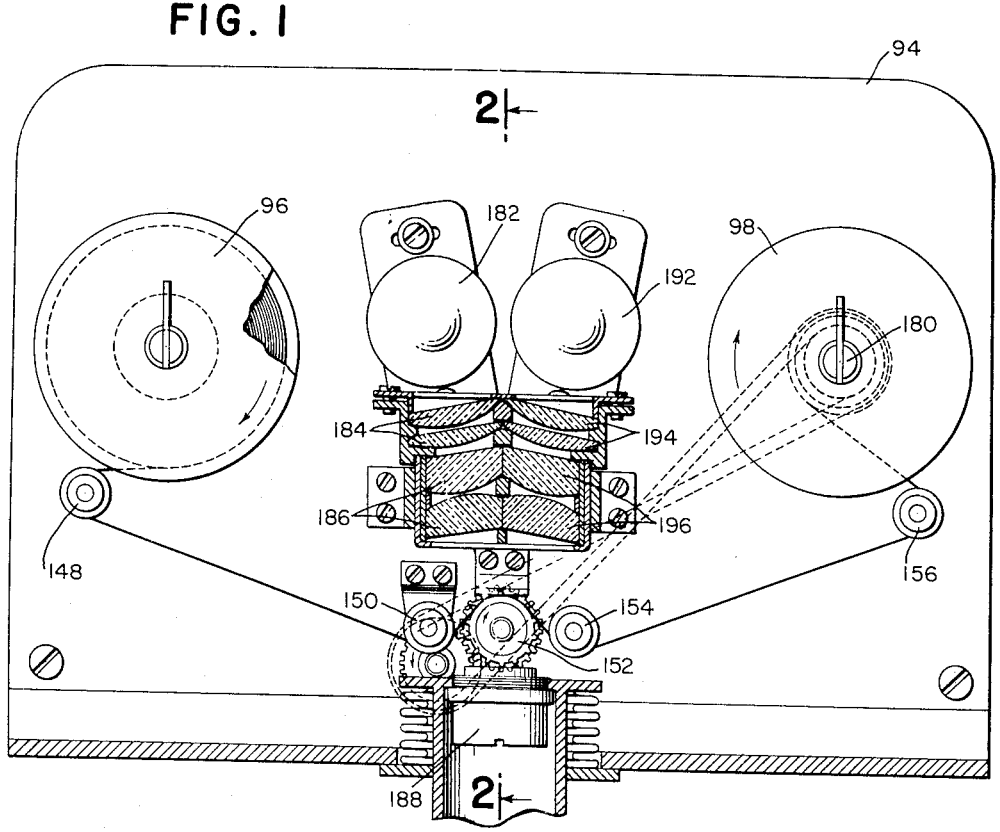
Fig. 1 is an elevational view of the projection unit of the machine, parts being shown in section.
Figure 9:
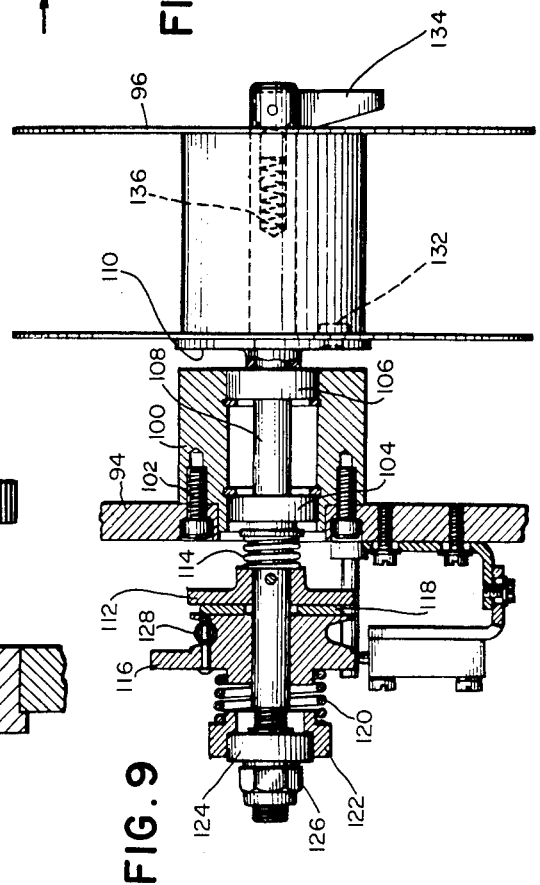
Fig. 9 is a view, partly in section, of a film supply reel located at the left in the optical unit as seen in Fig. 1.

By reference to Fig. 1 of the drawings it will be observed that mounted for rotation on the plate 94 is a film supply spool 96 and a film take-up spool 98. The supply spool 96 and the mounting therefor is best shown in Fig. 9 of the drawings. A bearing housing 100 is attached to the plate 94 by means of a plurality of machine screws 102. The housing is of cylindrical structure and contains two ball bearing assemblies 104 and 106. The supply spool shaft 108 has a flange and hub 110 which abuts the inner race of ball bearing assembly 106. A friction disc 112 is pinned to the shaft 108. A spring 114 keeps the bearings slightly loaded in thrust. A combined cam and groove pulley 116, loose on the shaft 108, has on its right face (as seen in Fig. 9) a disc of friction material 118. A spring 120 between a collar 122 and the cam and groove pulley 116 exerts pressure between the friction lining 118 and the disc 112. The collar 122 is mounted on a ball bearing assembly 124. Tension of the spring 120 may be varied by means of an adjusting nut 126 at the left end (as seen in Fig. 8) of the shaft 108. One end of a tension spring 128 is attached to the cam and groove pulley 116, and the other end is secured to a pin 130 extending from the face of the plate 94 (Fig. 5). A hole in the inner flange of the film spool 96 is engaged by a pin 132 riveted to the flange 110 of the supply shaft.

A pivoted, locking lever 134 is carried at the free end of the shaft 108 so that it may be swung into alignment with the free end of the shaft to permit the placing of the film spool 96 on the shaft. When the lever 134 is swung about its pivot into the position shown in Fig. 9, the film reel is securely locked to the shaft. A spring 136 holds the lever 134 impositively in either of its positions.

Fig. 5 of the drawings shows the normal position of the cam and groove pulley 116 when no film tension is on the supply reel 96. In this position the spring 128 holds a projection 138 of the cam 116 against a stop pin 140. As film is pulled off the supply reel 96, the shaft 108 rotates clockwise as viewed in Fig. 1. The cam and groove pulley 116 rotate counterclockwise (Fig. 5) due to the driving effect of the friction disc 118 (Fig. 9). During rotation of the cam and groove pulley 116, the spring 128 wraps itself about the pulley. The cam portion of the cam and groove pulley 116 is so shaped that about midway in its rotation (Fig. 5) between stop pin 140 and a stop pin 142 a plunger 144 is depressed to close the contacts of an acroswitch 146. After the cam and pulley 116 is arrested by the stop pin 142, further rotation of the shaft 108 is resisted by the friction disc 118, thus keeping tension on the film as it is pulled from the supply reel. Since a friction brake exerts a retarding force only while the shaft is rotating, spring 128 tends to exert a stactic tension on the film if the machine should be stopped in the middle of a run.

The film guide and take-up mechanism is shown in Figs. 1 through 4 of the drawings. As the film comes from the supply reel 96, it passes over an idler pulley 148, under an idler pulley 150, over a film feed sprocket 152, under an idler pulley 154 and around an idler pulley 156 to the take-up reel 98.

Figure 2:
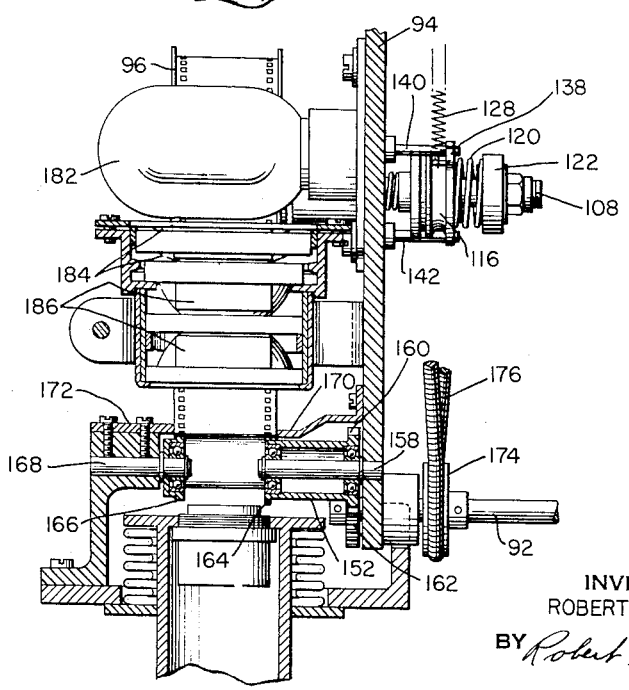
Fig. 2 is a sectional view on line 2—2 of Fig. 1.
Figure 3:
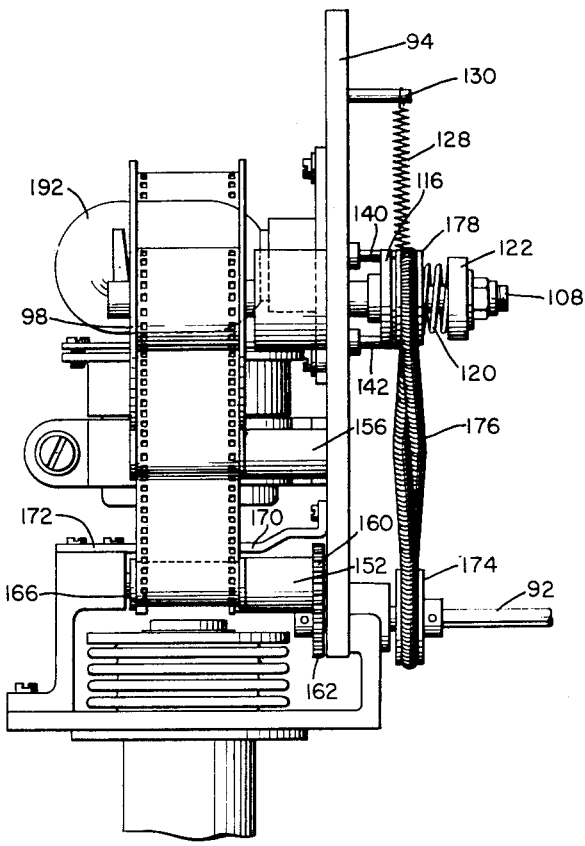
Fig. 3 is an elevational view taken from the right of Fig. 1.
Figure 4:
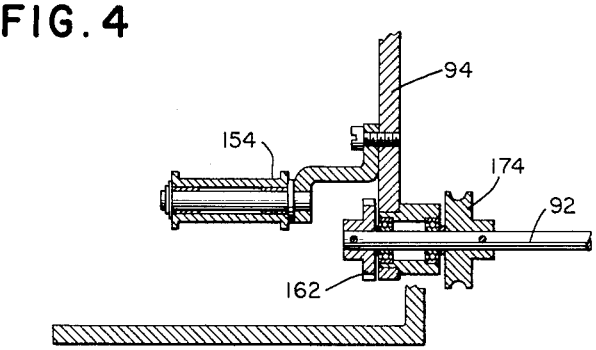
Fig. 4 is a detail view showing certain film drive mechanism.

Fig. 2 will best show that the film feed sprocket 152 is mounted on the outer races of ball bearing assemblies, the inner races of which are mounted on a stationary stud shaft 158. The right end of the feed sprocket 152, as viewed in Fig. 2, has a gear portion 160 which meshes with a gear 162 keyed to the drive shaft 92. The left end of the feed sprocket, as viewed in Fig. 2, has projecting teeth 164 which engage the feed perforations at one edge of a film strip. The film, as it goes about the sprocket 152, is supported at one edge only by the sprocket 152, and consequently there has been provided an axially spaced and independently mounted sprocket 166 which is adapted to engage the feed perforations at the opposite edge of the film strip. While the sprocket 166 is spaced from the sprocket 152 it is to be noted, however, that it is of the same diameter and is mounted on a shaft 168 which is coaxial with the shaft 158. The central portion of the film is thus unobstructed and illuminating light rays can be directed through the film at this point as will be explained later in this specification. As the film describes a curved path as it wraps around the feed sprockets 152 and 166, the film is rigid and does not tend to buckle in the center.

It is contemplated that suitable film centering mechanism such as disclosed in my aforesaid application, Serial No. 88,452, may be employed, but for the purpose of simplicity there has been shown herein a pair of film guides 170 and 172 which engage the opposite edges of the film during its passage through the projection zone that are quite adequate for the purpose of centering the film in its path if the film is of reasonably uniform and constant width.

The drive shaft 92 has fixed for rotation therewith a grooved pulley 174 about which is trained a belt 176 engaging in driving relation a similar grooved pulley 178 carried by the shaft 180 on which the take-up reel 98 is located. Thus it becomes clear how the film may be driven through the sensing zone of the optical system in synchronism with movement of cards through the reproducing unit.

It remains to be seen how film presented at the gap between the film feed sprockets 152 and 166 may be illuminated and the illuminating rays thereof directed to control instrumentalities, whereby control numbers may be read from one film frame concurrently with the reading of data from an adjacent film frame. In this regard Fig. 6 of the drawings is a diagrammatic illustration of the optical system represented in detail insofar as the upper part thereof is concerned in Fig. 1 of the drawings. Insofar as the film sensing zone between the film feed sprockets 152 and 166 is concerned, it may be noted here that it includes an advanced sensing station wherein control numbers are read from a trailing film frame and a reading section wherein the data of a leading film frame is read. The advanced sensing station may be considered as the left upper quadrant of Fig. 1, while the data reading station may be considered as the upper right quadrant of Fig. 1 as the film passes about the film feed sprockets.

Light from an arc lamp 182 is condensed into a line of light across the film at the advanced sensing station by means of two cylindrical lenses 184 and two spherical lenses 186. The control numbers in the advanced sensing station are imaged by a projection lens 188 at the intersection of a plurality of crossed mirrors 190. The nature of the mirrors 190 will be described in greater detail at a later point. It is sufficient to say at this point that the mirrors direct light to a plurality of photocells which are of the side view type.

Light from an arc lamp 192 is condensed into a line of light across the film at the advanced data reading station by a pair of cylindrical lenses 194 and a pair of spherical lenses 196. A film frame at the data reading station is imaged by the projection lens 188 at the intersection of a set of crossed mirrors 198 which is of the same construction as the crossed mirrors 190 and has associated therewith a similar plurality of side viewing photoelectric cells.

In the bottom of the optical cabinet are two sets of photocells 200, each set consisting of three rows of photocells arranged around the crossed mirror devices 190 and 198. As will appear in the circuit description, each photocell has therewith associated a thyratron which it influences.

There are 80 columns on a record card of the type to be processed with a machine of this kind, and the photocells best suited for the purpose in the present system are of such size that they should be arranged in two or more groups. The photocells responsive to the control numbers at the advanced sensing station will not aggregate, as a rule, 80 photocells, but only a sufficient number to accommodate the longest control number apt to be found; perhaps six or eight such cells will satisfy average requirements.

The photocells that are arranged at the bottom and in direct line with the beams of light coming through the condensing lens 188 are responsive to the direct rays themselves, whereas those that are laterally offset are responsive to a reflected beam. This latter function is served by the mirror assemblies 190 and 198 wherein small individual mirrors 202 and 204 are spaced and set at a 45° angle into a stationary frame 206 extending parallel to the rows of photocells 200; each mirror reflects a light ray 208 laterally to a particular photocell 200, in the right and left hand rows of photocells. In short, each film column has a particular photocell assigned to it, and any ray of light coming through a transparent spot in that film column will, at the proper instant, strike the photocell for that particular column. If that particular photocell is in one of the rows of cells at the right or left, the ray will be directed to its proper photocell by reflection to right or left by its individual mirror 202 or 204, but if the proper photocell is in the bottom row it will be reached by an undiverted ray passing straight down between the mirrors through a space provided for that purpose.

It will appear from the foregoing that during operation of the machine a synchronous drive for the optical equipment is taken from the reproducer shaft 10 by way of the shaft 20 and its associated gears. Since this drive is continuous, it follows that whenever the film clutch magnet FCM is energized, film will feed from the reel 96 to the reel 98 and in its course it will pas about the feed sprockets 152 and 166 which constitutes the sensing station.

Figure 6:
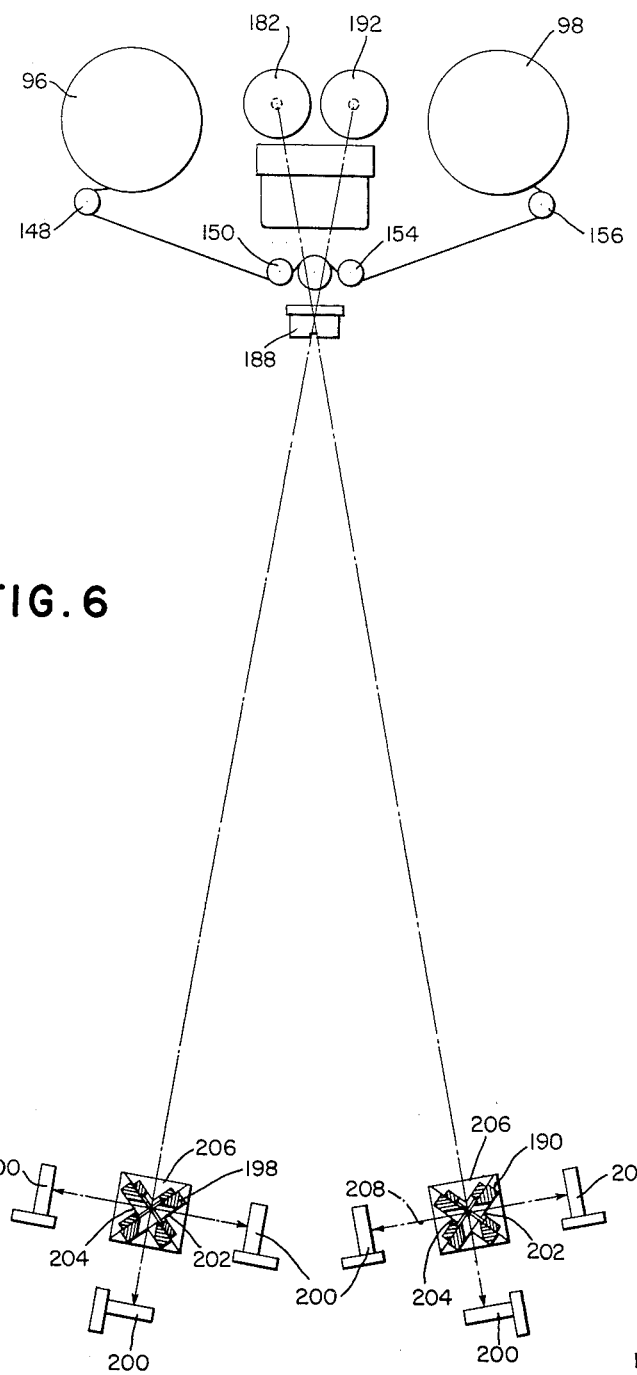
Fig. 6 is a diagrammatic illustration of the optical system showing two sets of inclined mirrors with three rows of photocells associated with each thereof.

Illumination from the lamp 182 will project light through film spots representative of a control number to activate the photocells at the right in Fig. 6, while light from the lamp 192 will illuminate the data represented on the advanced film frame and project a ray of light through spots in such frame representative of data to activate photocells of the group at the left of Fig. 6 of the drawings.

Before entering upon a detailed description of the control circuit it seems appropriate to note at this point that control numbers sensed in the reading section of the reproducer of Fig. 7 are stored electrically for subsequent electrical comparison with control numbers sensed in the film passing the control station of the optical system. In the event of control number agreement, data read from a film frame will be punched into a blank card disposed in the die block of the punching section of the reproducer of Fig. 7. In the event there is a lack of agreement between a control number sensed in a film frame and a control number from a card as represented by the number in storage, provision has been made to avoid card punching. The manner in which these controls function will be clear from the following circuit description.

Figs. 11a through 11d show the electrical control circuit for the machine herein. Closure of a sentinel switch 210 applies 110 volts alternating current to lines 212 and 214. A circuit is then established through a pair of relay coils HD3 and HD4 causing them to be energized and to close their associated points. Closure of the HD3 relay points completes a circuit to a motor 216 which drives a generator 218. When the generator 218 gets up to speed, 40 volts direct current will be applied to lines 220 and 222. Relay points HD4 complete a circuit to the primary winding of a transformer 224. The secondary winding of the transformer 224 supplies heater current for the thyratrons used in the machine.

A circuit is completed from line 212, through the normally closed relay points R100a, through a short-wave oscillator 226 and to line 214. When the short-wave oscillator 226 is energized, a high voltage, high frequency discharge appears across the electrodes of the concentrated arc lamp 182 to line 222. This discharge is prevented from going to line 220 by a choke coil 228. The breakdown of the concentrated arc lamp 182 by the high voltage, high frequency discharge allows 40 volts direct current to flow from line 220, through a current limiting resistor 230 and a relay coil R100 in parallel with it, choke coil 228, concentrated arc lamp 182 to line 222. When the relay coil R100 is energized, relay points R100a are opened, thus interrupting the circuit to the short-wave oscillator 226. The lamp 182 thus continues to operate on 40 volts direct current. As hereinabove pointed out, the lamp 182 is located at the advanced film station. A similar lamp 192 is located at the film reading station, and its operation is similar to that of the advanced film station lamp 182. In this regard it will be noted that the circuit for lamp 192 includes a short-wave oscillator 232, a current limiting resistor 234, relay coil R101 having a relay point a and a choke coil 236.

Threading of film into the projector causes closure of the acrobrake switch 146, which causes energization of a relay coil R103. When cards are placed in the read magazine R, the presence thereof causes closure of the read magazine card lever contact RMCLC which in turn results in energization of a relay coil R6. The weight of cards in the card punch magazine P causes closure of the punch magazine card lever contact 240 and this results in the energization of a relay coil R3.

A circuit is completed from line 212, through the primary winding of a second transformer 242 to line 214. The secondary winding of the transformer 242 supplies a small direct current power supply consisting of two selenium rectifiers 244, condensers 246, 248 and 250, current limiting resistor 252, voltage regulator tube 254 and bleed resistors 256 and 258. A tap on the resistor 256 is connected to the negative line 22 of the generator 218. The connection 260 supplies the normal negative bias for the grids of the thyratrons, and connection 262 supplies the normal positive bias for the photocells.

A time delay circuit which prevents operation of the machine until the thyratrons have had time to heat up is as follows: A circuit extends from the line 220, through a thermal coil 264 of a relay R102 to line 222. After the usual time (about 30 seconds) has elapsed, the thermal contacts R102a close, energizing relay coil R102. The R102b points then transfer and establish a holding circuit for relay coil R102, thereby interrupting the circuit through the thermal coil 264. Upon cooling of the thermal coil 264, the thermal contacts R102a return to their normally open position. The relay R102 has normally open contact points R102d in the plate circuit of the thyratrons. The foregoing circuits condition the machine for operation.

Figure 11D:
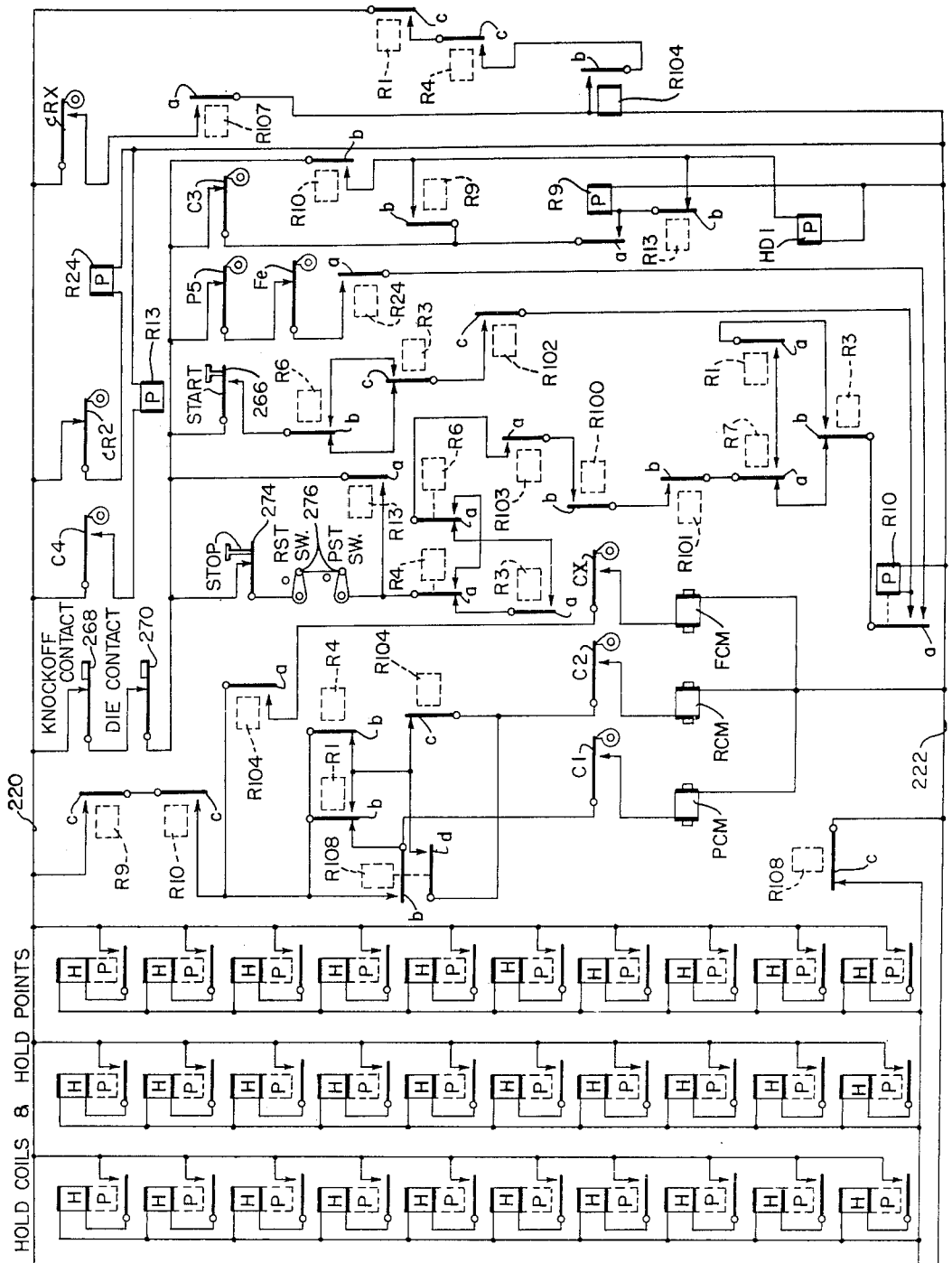
Figure 12:
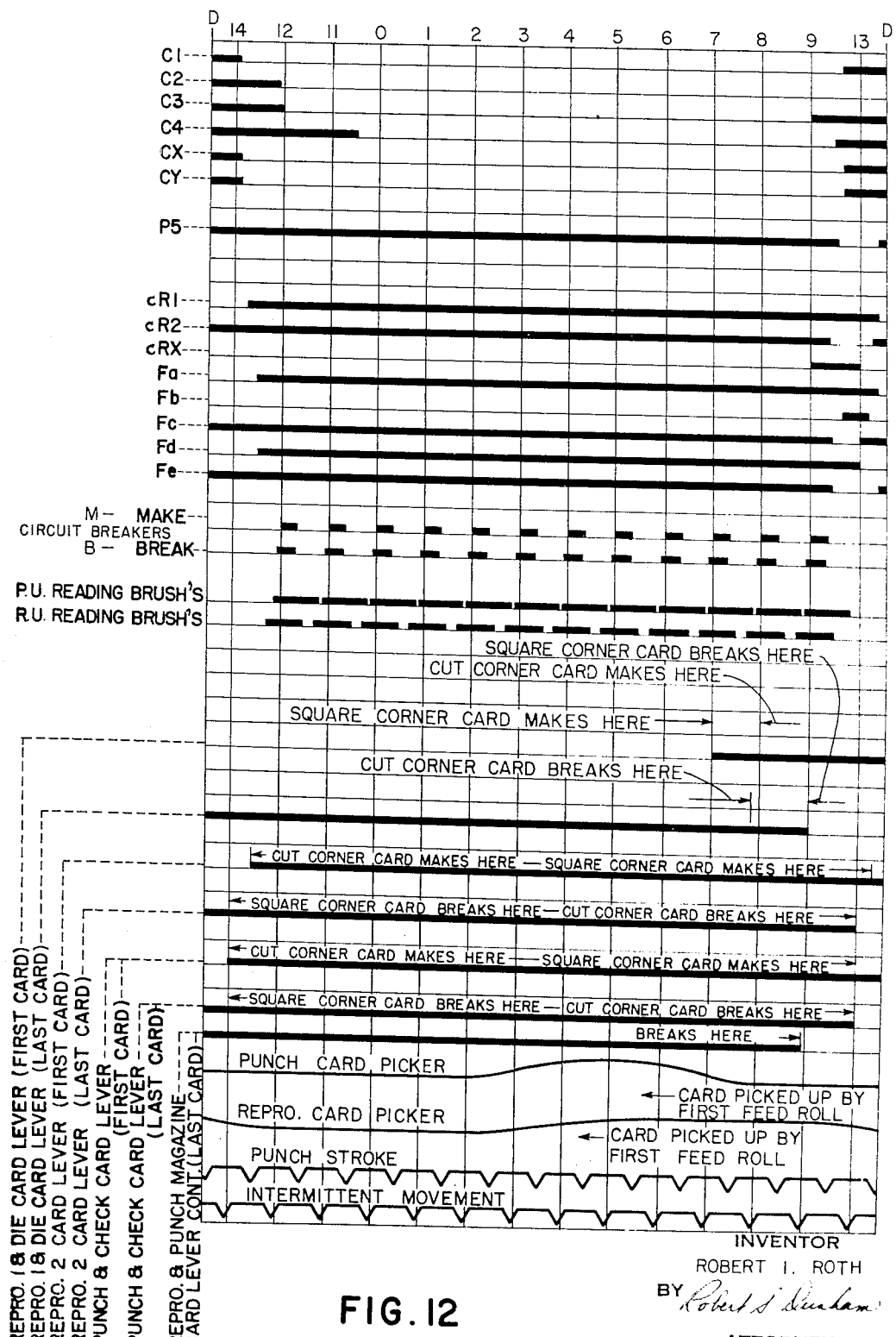
Fig. 12 is a timing chart.

Depression of the start key 266 (Fig. 11d) completes a circuit from line 220, through the usual knock-off contact 268 and die contact 270, through the start key, now transferred relay points R6b (because of cards in the read magazine), now transferred R3c points (because of cards in the punch magazine), closed R102c points, coil of relay R10 to the other side of direct current line 222. The energization of relay R10 causes closure of the R10b relay points, thus energizing relay HD1. A branch circuit extends through the normally closed R13b points to energize a relay coil R9. Assuming that the machine has stopped between 6 and 9 on the index (Fig. 12) as it should have done if adjusted correctly and that the start key is held depressed until cam contact C3 makes, which is at the 9 on the index, a holding circuit is established from the relay coil R9 through the R9a relay points, and the cam contacts C3. A holding circuit is also established for the HD1 relay through the R9b relay points, and cam contacts C3. Relay points HD1 close and complete a circuit to the drive motor. It should be mentioned that a relay R10 holds through its R10a points, then R24a points, and cam contacts Fe and P5. The relay R24 is energized because the R2 cam contacts are closed when the read feed is latched. Cam contacts P5 are also closed because the punch feed is latched.

The motor is now running at approximately 9 on the index, and it is desired to get both a card feed in the reading unit and a card feed in the punching unit in the next machine cycle. No film feed is desired in this succeeding cycle. When cam contact C1 closes, a circuit will be completed from the line 220, through the now closed R9c and R10c relay points, R1b points, in position shown, cam contact C1, punch clutch magnet PCM to line 222. When cam contact C2 closes, a branch circuit is completed that extends through the closed R4b points, the closed R104c points, cam contact C2 and read clutch magnet RCM to line 222. In this manner a card feed is initiated in the reading unit of the reproducer and a card feed is initiated in the punch unit of the reproducer for the next machine cycle.

In this next machine cycle the first card in the read unit is fed to the reading brushes RB, closing the RCLC1 contacts and the RCLC2 contacts. The closure of the RCLC1 contacts energizes relay coil R4, and the closure of the RCLC2 contacts energizes relay coil R107. In the same cycle the first card in the punch unit is fed to the die, closing the die card lever contact DCLC which energizes relay coil R1. Thus, toward the end of this cycle when the cam contact C1 makes, no circuit can be completed to the punch clutch magnet PCM because of the now transferred R1b relay points. However, at the proper time when cam contacts C2 make, a circuit will be completed to the read clutch magnet RCM through the transferred R1b points and the closed R104c points. This initiates a card feed in the read unit for the following cycle which is the cycle in which the first card passes the reading brushes RB.

In the following cycle, i. e. the cycle in which the first card in the reading unit passes the reading brushes RB, circuits will be completed from the line 222 through cam contacts CR1 (Fig. 11c), now closed R107b relay points, contact roll, holes in the card, read brushes RB, pick-up coils of the storage relays (Fig. 11c), emitters 272 to line 220 through intermittently closed make and break contacts M and B. As each storage relay is energized it is held through its own stick-point and relay point R108c. At the end of this cycle the punch brush card lever contacts PBRCLC close energizing relay coil R7. This completes the holding circuit for relay coil R10 which is as follows: Line 220, knock-off contact 268, die contact 270, stop key 274, stacker switches 276, transferred R4a points, transferred R6a points, closed R103a points, closed R100b points, closed R101b points, transferred R7a points, closed R1a points, transferred R3b points, closed R10a points, coil of relay R10 to line 222. The machine will now continue to run without further depression of the start key. Also, near the end of this same cycle when the cam contacts CRX close, a circuit will be completed to energize relay coil R104 through the now closed R107a points. Relay coil R104 holds through its R104b points, R4c points and R1c points. Closure of the R104a points establishes a circuit through the film clutch magnet FCM. When cam contact CX makes, same timing as C1, thus initiating a film feed in the following cycle, the R104c points open to prevent energization of the read clutch magnet RCM, thus causing latching of the read feed.

Figure 11B:
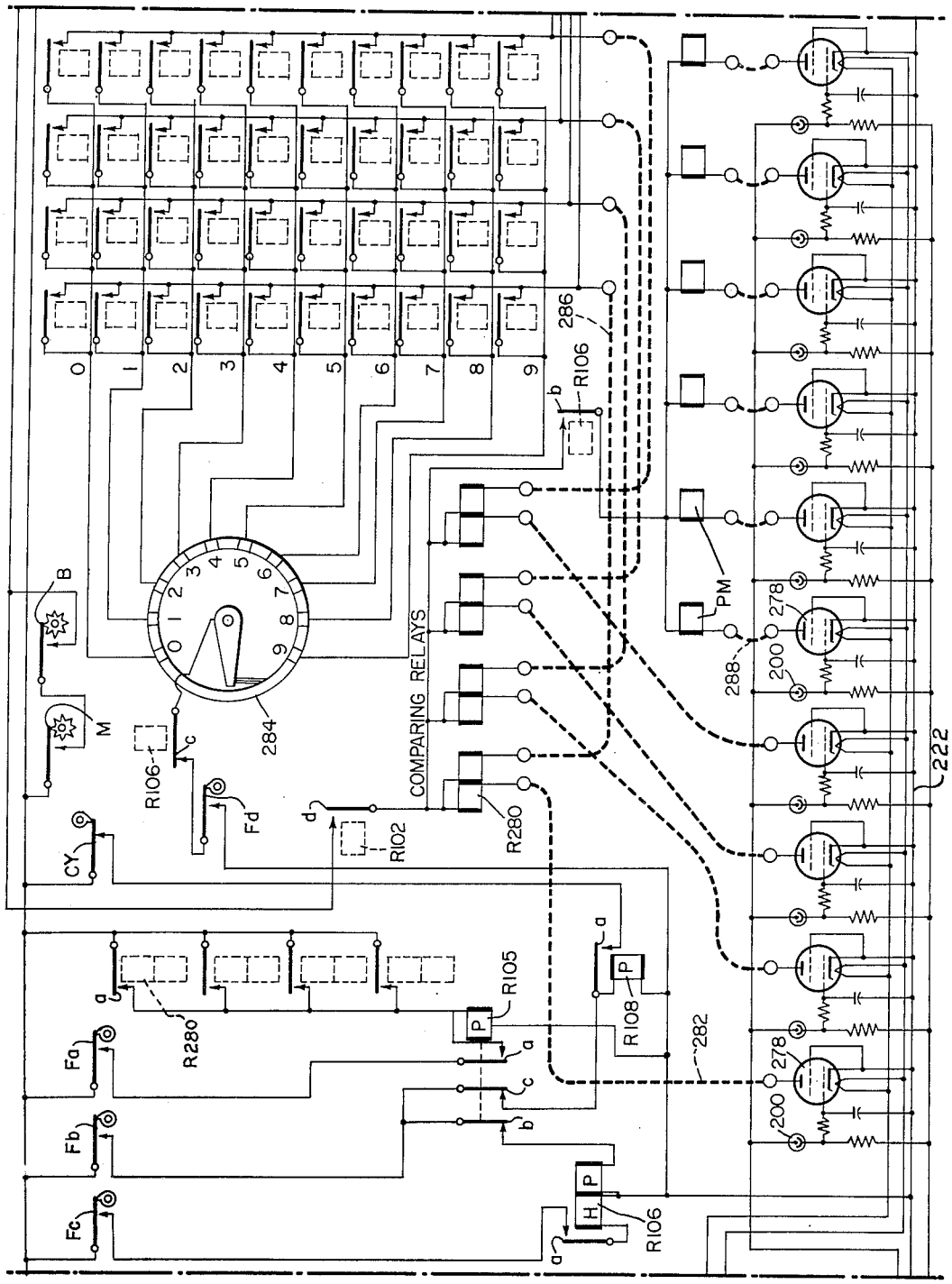
Figure 11C:
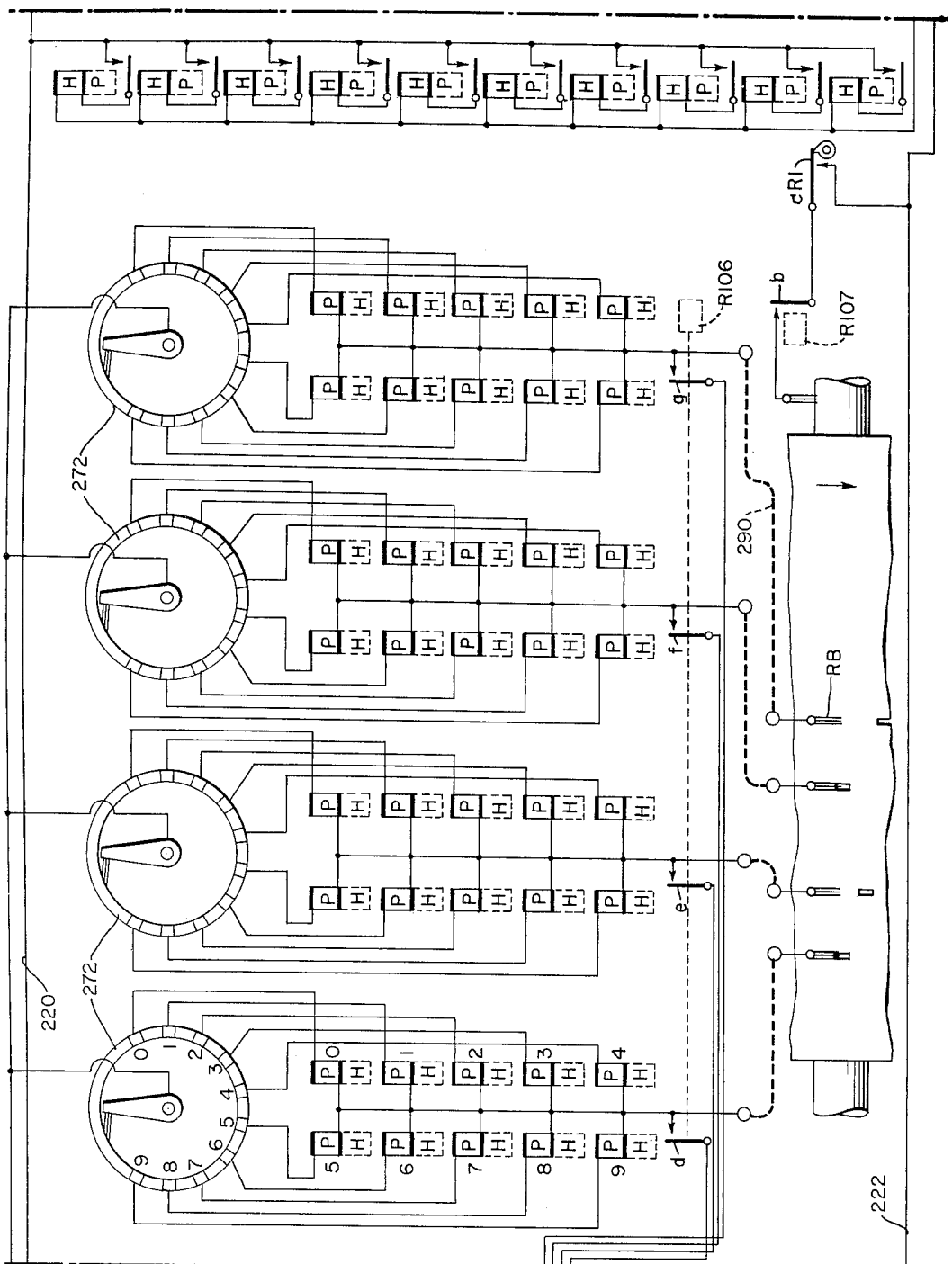

On succeeding cycles only film will be fed and each film frame will be compared against the number stored in the storage relays. A cycle in which no agreement occurs is as follows: A transparent spot in a column on the film permits light to fall upon the photocells 200 associated with that column. Light striking the photocell 200 causes a thyratron 278 associated with it to become conductive. At this point it is pertinent to note that Fig. 11b of the drawings shows only four comparing relays R280 and only four control number sensing photocells 200 with their associated thyratrons 278. In some applications it may be desirable to increase the number of comparing relays to adapt the reading and comparing of control numbers having a greater number than four digits. However, the four herein illustrated are sufficient for the purpose of this disclosure. By the same token, Fig. 11b shows only six punch magnets PM and their six associated control photocells 200 and associated thyratrons 278. It will be recalled that the record card mentioned hereinbefore in this specification has 80 columns, for recording in each column thereof. It will follow, therefore, that the reproducing punch of the reproducer will have 80 separate punches in alignment, each under control of one of the punch magnets PM. However, since this simply represents a multiplication of the required circuitry, it is deemed sufficient for the purpose of this application to show a smaller number as the six shown in Fig. 11b of the drawings.

When a thyratron responsive to a control number becomes conductive it permits the flow of current from the line 222, through the cathode and plate of the thyratron, a plug wire 282, one coil of the bucking relay R280, now closed R102d relay points, and contacts of circuit breakers B and M to line 220. At the same time circuits can be completed from the line 222 through the Fd cam contacts, the R106c points, emitter 284, points of the storage relays (upper right part of Fig. 11b), plug wires 286 to the opposite side of the bucking relays R280, closed R102d points, and the contacts of circuit breakers B and M to line 220.

If the number read from the film does not agree with the number in storage, the comparing relay R280 in one or more columns will close its points and energize relay R105 which will hold through its R105a points and cam contacts Fa. Each energization of relay R105 will open the R105b points, and prevent the pulse from cam contacts Fb getting through to energize relay R106.

If the number on the film agrees with the number in storage, relay coil 106 will be picked up near the end of the cycle when cam contacts Fb close and will be held energized throughout the following cycle by means of the R106a relay points and cam contacts Fc.

In the cycle following an agreement cycle it is desired to punch a card under control of the film frame which is passing the film reading station. At the same time there is a film frame passing the advanced film station, and it is possible that this film frame may match the next card in the read unit. Consequently, in the cycle following an agreement cycle, it is desired to read a film frame and punch a card from it. It is also desired to feed a card in the read unit of the reproducer, put the control number in such card in storage and simultaneously compare the number on the card with the number on the film frame which is passing the advanced film station. The relay points R105c (Fig. 11b) permit pick-up of relay coil R108 which holds through the R108a points and cam contact CY. The R108b points close to initiate a feed in the punch unit for the following cycle and the R108d points close to initiate a feed in the read unit for the following cycle. The R108c points open to drop out the storage relays. The R106c points open to interrupt the comparing circuits through the points of the storage relays for the following cycle. The R106b points close to complete the circuit to the punch magnets for the following cycle.

Thus on a cycle following an agreement cycle, the film frame which agrees with the storage relays at the advanced sensing station during the agreement cycle is fed past the film reading station. At this station, the transparent spots on the film are projected on the photocells 200 at the left of Fig. 6 of the drawings, and any photocell that is activated by light falling thereon will cause its respectively associated thyratron 278 to become conductive. A typical punch magnet circuit is as follows: Line 222, cathode and plate of thyratron 278, plug wire 288, punch magnet PM, now closed relay point R106b, closed relay points R102d, contacts of circuit breakers B and M to line 220. At the same time the next card is being read in the read unit of the reproducer and circuits will be completed from the line 222, through cam contacts cR1 (Fig. 11c), relay points R107b, the contact roll, brushes RB, plug wires 290 (Fig. 11c), pick-up coils of the storage relays, emitters 272, contacts of circuit breakers B and M to the line 220. Branch circuits extend through the R106d, R106e, R106f and R106g relay points to the readout lines of the storage relays and thence by means of plug wires 286 to one side of the comparing relays R280, closed relay points R102d, contacts of circuit breakers B and M to line 220. It should be noted that circuits cannot be completed through the emitter 284 because of the open R106c relay points. The other side of the comparing relays are fed by circuits through the thyratrons 278.

If the film frame passing the control station does not match the card passing the brushes in the read unit, one or more of the comparing relays R280 will close its points, causing energization of the relay coil R105. Relay coil R105 will be held energized through its R105a point and cam contacts Fa. Thus there can be no re-energization of relay coils R106 and R108. Both the punch unit and the read unit of the reproducer will latch at the end of the cycle because of the failure of relay points R108b and R108d to close.

If the film frame passing the control station matches the card passing the brushes in the read unit of the reproducer, relay coil R105 will not be energized and consequently relay coils R106 and R108 will be re-energized and cause a repetition of events of the preceding cycle.

Operation will now continue until the machine runs out of film or cards. In the event of the film becoming exhausted the machine will stop when the acrobrake switch 146 opens, thereby dropping out relay coil R103. The points R103a of the relay coil R103 will open in the stop key circuit and relay coil R10 will drop out when cam contacts Fe open. New film can be placed in the machine and operations will continue upon depression of the start key. If the supply of cards in the card magazine R of the reproducer unit becomes exhausted, the machine will stop due to relay R6 dropping out and the opening of the R6a points in the stop key circuit. In such event, a replenished supply of cards in the read magazine will re-enable the machine to operate.

Having thus described my invention I claim:

1. In a record card reproducing system, means for automatically sensing control indicia from each of a plurality of record means, means for electrically storing such idicia, a card punching station, means for feeding a blank record card to said card punching station, an optical system including a light source for projecting a film strip of indefinite length having photographically recorded thereon a succession of perforated records separate from the first named record means and including control indicia and record data, the number of said records being limited only by the length of said film strip, means in said optical system including means sensitive to a beam of light from said light source projected through control indicia on the film, means under control of said light sensitive means for comparing film control indicia with the electrically stored indicia, means for projecting record data from the same photographic film, light sensitive means responsive to projected record data, punch control means responsive to said last named light sensitive means, and means operative upon a comparison of stored control indicia and film control indicia and only when the indicia thus compared are identical, to render active said punch control means in response to said light sensitive means actuated by projected film data, whereby the data of selected film frames is reproduced in punched cards under the selective control of such stored control indicia.

2. In a record card reproducing system, means for sensing perforated control indicia in a record card, means for electrically storing such indicia, a card punching station, means for feeding a blank record card to said card punching station, an optical system including a pair of separate condensing lens systems and a projection lens common to both said systems, a light source cooperating with one of said lens systems for projecting a film strip having photographically recorded thereon a succession of perforated records including control indicia and record data, means in said optical system including means sensitive to a beam of light from said light source projected through control indicia on the film, means under control of said light sensitive means for comparing film control indicia with the electrically stored indicia, means including a second light source cooperating wtih the other of said lens systems for projecting record data from the same photographic film, light sensitive means responsive to projected record data, punch control means responsive to said last named light sensitive means, and means operative upon a comparison of stored control indicia and film control indicia and only when the indicia thus compared are identical, to render active said punch control means in response to said light sensitive means actuated by projected film data, whereby the data of film frames is reproduced in punched cards under the selective control of such stored control indicia.

3. In a record card reproducing system, means for automatically sensing control indicia from each of a plurality of record means, means for electrically storing such indicia, a record reproducing station, means for feeding a blank record to said reproducing station, an optical system including a light source for projecting a film strip of indefinite length having photographically recorded thereon a succession of records separate from the first named record means and including control indicia and record data, the number of said records being limited only by the length of said film strip, means in said optical system including a plurality of first photoelectric cells sensitive to a beam of light from said light source projected through control indicia on the film, means under control of said first photoelectric cells for comparing film control indicia with the electrically stored indicia, means for projecting record data from the same photographic film, a plurality of second photoelectric cells responsive to projected record data, record reproducing means responsive to said plurality of second photoelectric cells, and means operative upon a comparison of stored control indicia and film control indicia and only when the indicia thus compared are identical, to render active said record reproducing means in response to said second photoelectric cells actuated by projected film data, whereby the data of film frames is reproduced under the selective control of such stored control indicia.

4. In a record card reproducing system, means for successively sensing perforated control indicia from each of a plurality of record cards, means for successively electrically storing such indicia, a card punching station, means for successively feeding blank record cards to said card punching station, means for passing a film strip through a predetermined path including a control station to be occupied by one frame of a film strip and a reading station adjacent to said control station to be occupied simultaneously by another frame of said film strip, an optical system including a pair of separate condensing lens systems each having a light source cooperating therewith and disposed to project light beams through the frames of said film strip at said control and reading stations respectively, a projecting lens common to said lens systems, said film strip having photographically recorded thereon a succession of perforated records each including control indicia and record data, means in said optical system including a plurality of photo-sensitive means positioned to be impinged by a beam of light passing from one of said light sources through a frame of said film located at said control station and responsive to the control indicia on said film, means under control of said photo-sensitive means for comparing film control indicia with indicia which is electrically stored at the time, means including the other of said light sources for projecting record data from a frame of the same photographic film which is located at said reading station, a second group of photo-sensitive means responsive to the projected record data, punch control means responsive to the second photo-sensitive means, and means operative upon a comparison of the indicia electrically stored and the film control indicia sensed as aforesaid and operative only when the indicia thus compared are identical to render active said punch control means in response to the second group of photosensitive means actuated by the projected film data at said reading station for reproducing the data sensed at the reading station by punching it on a record card, and means responsive to the production of a punched record card as aforesaid corresponding to a record on said film strip for sensing perforated control indicia from a next of said plurality of record cards for comparision with subsequent control indicia from said film as aforesaid.

5. A system in accordance with claim 1, in which said record means comprises a plurality of cards having control indicia punched therein, a magazine for said cards, means for moving said cards successively from said magazine; in which said means for sensing control indicia comprises means for sensing such indicia from punched cards from said magazine; and further comprising means for supplying a card from said magazine to the last named sensing means each time a card is punched at said card punching station.

References Cited in the file of this patent

UNITED STATES PATENTS

| | | |
|---|---|---|
| 1,962,732 | Bryce et al. | June 12, 1934 |
| 2,046,082 | Mills | June 30, 1936 |
| 2,098,305 | Nichols | Nov. 9, 1937 |
| 2,124,906 | Bryce | July 26, 1938 |
| 2,172,330 | Bryce | Sept. 5, 1939 |
| 2,199,541 | Harrison et al. | May 7, 1940 |
| 2,224,764 | Dickinson et al. | Dec. 10, 1940 |
| 2,251,998 | Goodale | Aug. 12, 1941 |
| 2,323,372 | Bryce | July 6, 1943 |
| 2,343,414 | Johnson | Mar. 7, 1944 |
| 2,362,004 | Heidinger | Nov. 7, 1944 |
| 2,425,950 | Morrison | Aug. 19, 1947 |
| 2,438,588 | Tolson | Mar. 30, 1948 |
| 2,463,534 | Hawkins | Mar. 8, 1949 |